United States Patent
Nanduri et al.

(10) Patent No.: US 11,379,835 B2
(45) Date of Patent: Jul. 5, 2022

(54) SYSTEM, METHOD, AND COMPUTER PROGRAM PRODUCT TO ENSURE DATA INTEGRITY FOR CONDUCTING A PAYMENT TRANSACTION

(71) Applicant: Visa International Service Association, San Francisco, CA (US)

(72) Inventors: Priya Nanduri, Sunnyvale, CA (US); Vilas Hegde, Bangalore (IN); Murugesh Moorthy Panchali, Sammamish, WA (US); Larry O'Connor, Bellingham, WA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 16/943,861

(22) Filed: Jul. 30, 2020

(65) Prior Publication Data
US 2021/0035100 A1    Feb. 4, 2021

(51) Int. Cl.
*G06Q 20/40* (2012.01)
*H04L 9/32* (2006.01)

(52) U.S. Cl.
CPC ......... *G06Q 20/401* (2013.01); *H04L 9/3247* (2013.01)

(58) Field of Classification Search
None
See application file for complete search history.

(56) References Cited

U.S. PATENT DOCUMENTS

| | | | | |
|---|---|---|---|---|
| 5,671,279 A * | 9/1997 | Elgamal | .............. | H04L 63/0428 705/75 |
| 5,978,840 A * | 11/1999 | Nguyen | .................. | G06Q 30/06 705/79 |
| RE40,444 E * | 7/2008 | Linehan | .................. | G06Q 20/02 713/172 |
| 8,909,556 B2 * | 12/2014 | Huxham | ............ | G06Q 20/3823 713/168 |
| 9,660,814 B2 * | 5/2017 | Huxham | ............... | H04L 9/3263 |
| 9,813,245 B2 * | 11/2017 | Le Saint | ................... | H04L 9/14 |
| 9,996,835 B2 * | 6/2018 | Dill | .......................... | H04L 9/32 |

(Continued)

OTHER PUBLICATIONS

"EMV in Transit: What are These 'EMV Level 1, 2, 3' Certifications?", Identity Management & Security, 6 pages, https://ims.ul.com/emv-transit-what-are-these-emv-level-1-2-3-certifications-0.

(Continued)

*Primary Examiner* — Christopher Bridges
(74) *Attorney, Agent, or Firm* — The Webb Law Firm

(57) ABSTRACT

Provided is a computer-implemented method for conducting a payment transaction to ensure data integrity of the payment transaction that includes generating a transaction authorization request message, where the transaction authorization request message comprises a payload associated with an electronic funds transfer at a point-of-sale (POS) device, and where generating the transaction authorization request message includes generating a digital signature for the payload using a private key of a payment gateway system and inserting the digital signature for the payload into the transaction authorization request message, transmitting the transaction authorization request message including the digital signature, and receiving a transaction authorization response message from a transaction service provider system. A system and computer program product are also provided.

10 Claims, 10 Drawing Sheets

(56) References Cited

U.S. PATENT DOCUMENTS

| | | | |
|---|---|---|---|
| 10,181,120 B1 | 1/2019 | Holmes et al. | |
| 10,891,611 B2* | 1/2021 | Hayhow | G06Q 20/20 |
| 2003/0140007 A1* | 7/2003 | Kramer | G06Q 20/12 |
| | | | 705/40 |
| 2015/0254662 A1* | 9/2015 | Radu | G06Q 20/36 |
| | | | 705/21 |
| 2016/0232527 A1* | 8/2016 | Patterson | G06Q 20/401 |
| 2016/0321638 A1 | 11/2016 | Cheng et al. | |

OTHER PUBLICATIONS

"Options for Reducing Level 3 EMV Certification Time for Retailer systems using Electronic Payment Servers (EPS)", US Payments Forum, Oct. 2019, 19 pages, https://www.uspaymentsforum.org/wp-content/uploads/2019/10/EPS-EMV-L3-Certification-FINAL-Oct-2019.pdf.

"Visa's Merchant-Friendly EMV Moves", PYMNTS.com, Jun. 17, 2016, 10 pages, https://www.pymnts.com/news/emv/2016/visa-emv-certification-acceleration/.

\* cited by examiner

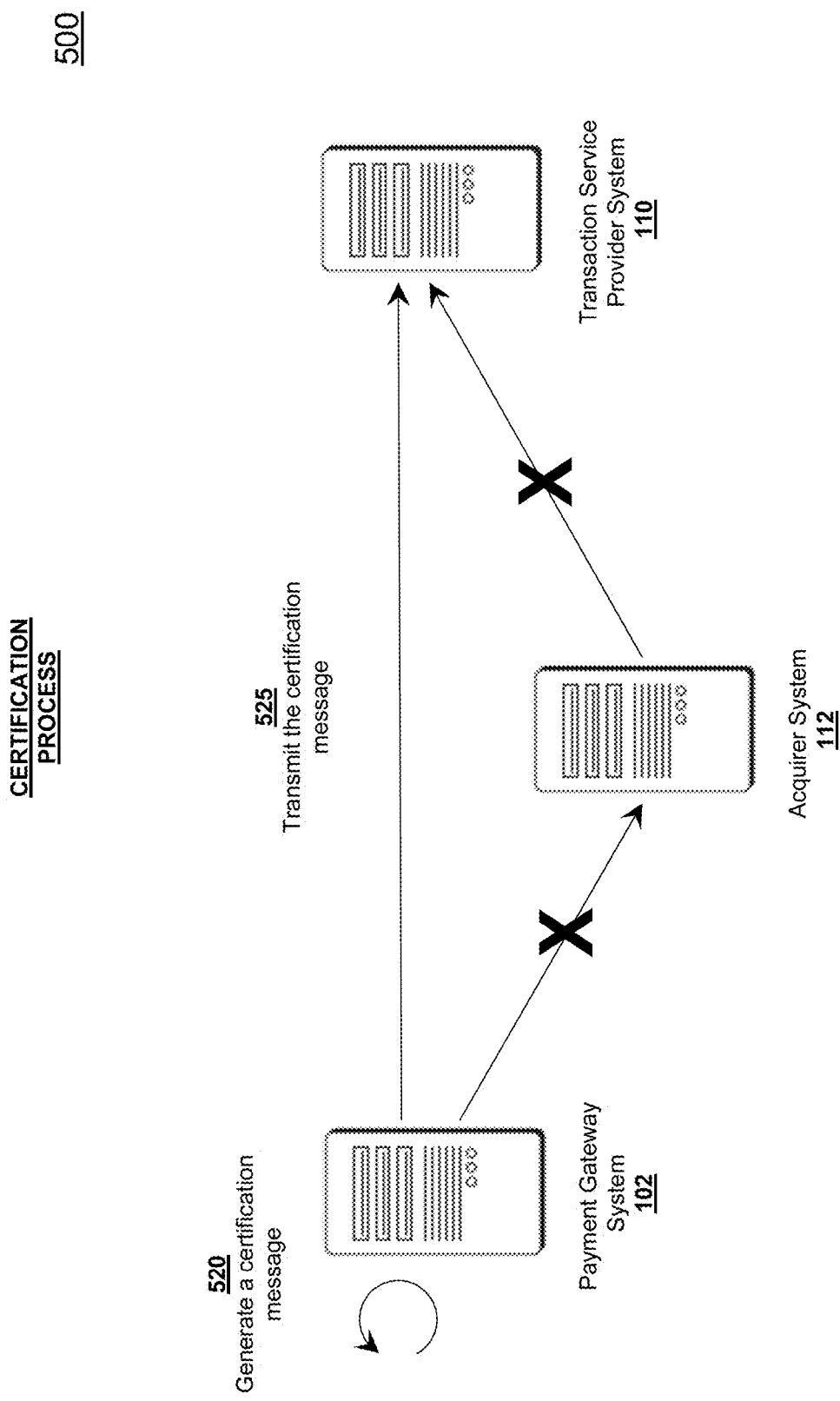

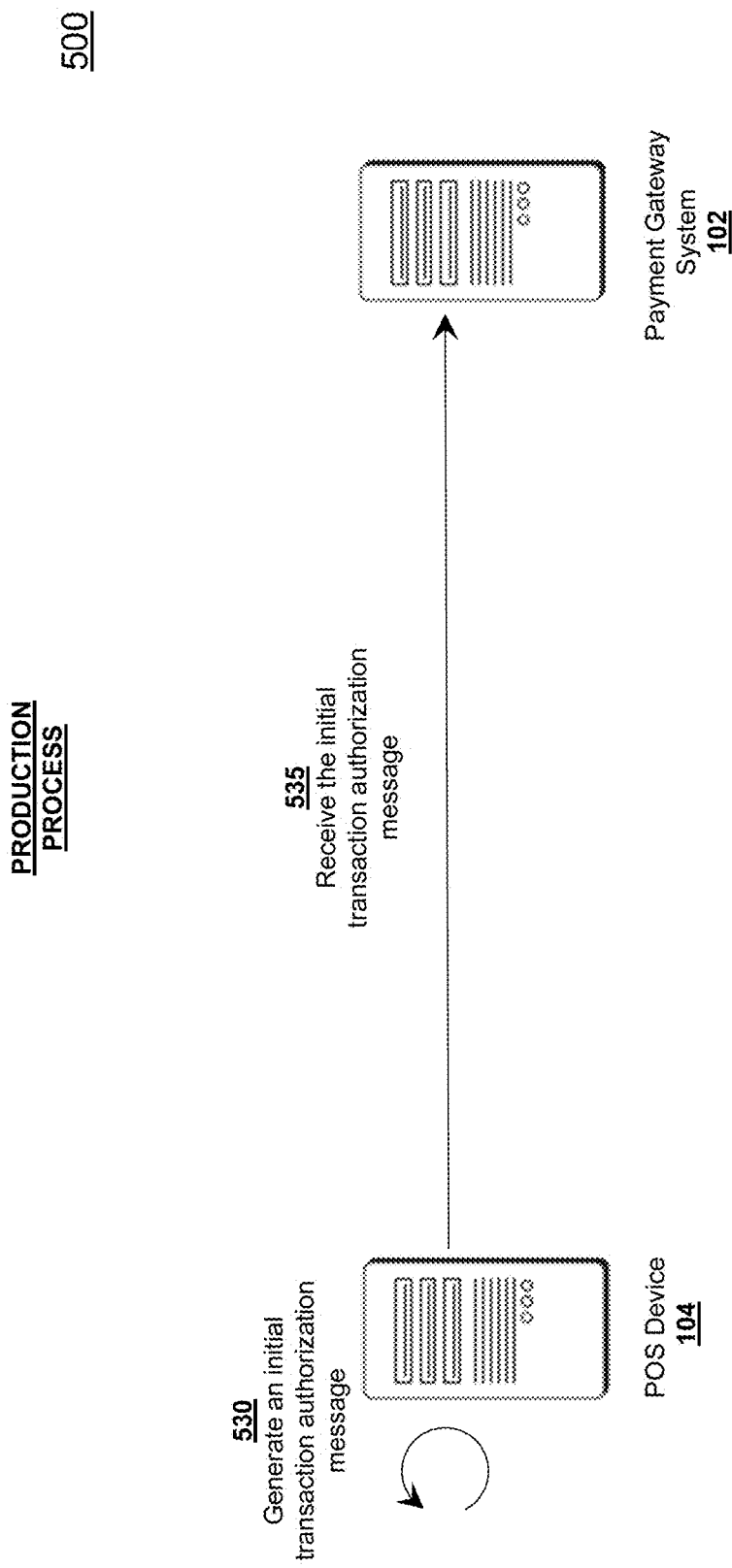

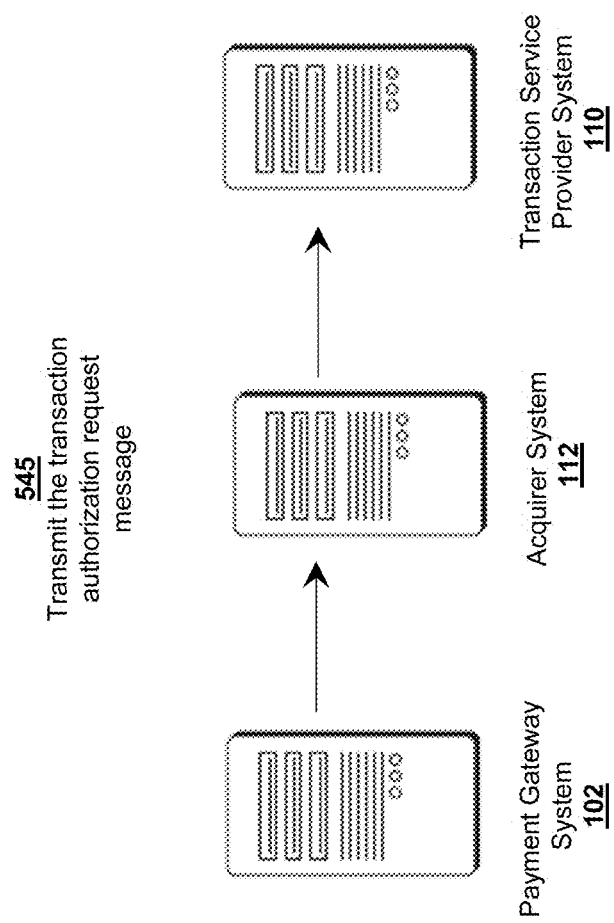

SYSTEM, METHOD, AND COMPUTER PROGRAM PRODUCT TO ENSURE DATA INTEGRITY FOR CONDUCTING A PAYMENT TRANSACTION

BACKGROUND OF THE INVENTION

1. Field of the Invention

This invention relates generally to systems, devices, products, apparatus, and methods for securely conducting a payment transaction and, in one particular embodiment, to a system, product, and method for conducting a payment transaction involving a payment gateway system to ensure data integrity of the payment transaction.

2. Technical Considerations

A point-of-sale (POS) device (e.g., a POS terminal, a POS machine, and/or the like) may be an electronic device that is used to process payment transactions at a merchant location (e.g., a retail location, a store, and/or the like). For example, a POS device may be used to receive information based on reading a customer's credit card or debit card, determine whether electronic funds in a customer's account associated with the customer's credit card or debit card are sufficient, account for a transfer of the electronic funds from the customer's account to a merchant's account, and store data associated with the payment transaction after processing of the payment transaction is complete. A merchant (e.g., an e-business merchant, an online retailer, a traditional brick and mortar retailer, and/or the like) may use a POS device associated with the merchant to conduct a payment transaction involving the merchant and a customer.

However, a POS device may be required to be certified by an acquirer associated with a merchant so that the POS device may be used by a merchant to conduct payment transactions. The POS device may be required to be certified to ensure that data integrity of the transaction data associated with the payment transaction is established. In some examples, the POS device may need to be certified by an acquirer, a provider of the POS device, a transaction service provider, and/or other entities involved in a certification process. The certification process may involve a large amount of time on behalf of the entities involved in the certification process. Furthermore, the POS device may need to be certified multiple times based on whether the POS device is used on a network of a transaction service provider that is different from the network on which the POS device was initially certified.

SUMMARY

Accordingly, systems, devices, products, apparatus, and/or methods for conducting a payment transaction involving a payment gateway system to ensure data integrity are disclosed that overcome some or all of the deficiencies of the prior art.

Further non-limiting aspects or embodiments are set forth in the following numbered clauses:

Clause 1: A computer-implemented method for conducting a payment transaction to ensure data integrity of the payment transaction, the method comprising: generating, with at least one processor, a transaction authorization request message, wherein the transaction authorization request message comprises a payload associated with an electronic funds transfer at a point-of-sale (POS) device, wherein generating the transaction authorization request message comprises: generating, with at least one processor, a digital signature for the payload using a private key of a payment gateway system; and inserting, with at least one processor, the digital signature for the payload into the transaction authorization request message; transmitting, with at least one processor, the transaction authorization request message including the digital signature; and receiving, with at least one processor, a transaction authorization response message from a transaction service provider system.

Clause 2: The method of clause 1, further comprising: transmitting the transaction authorization request message to the transaction service provider system without modifying the transaction authorization request message.

Clause 3: The method of clauses 1 or 2, wherein the transaction authorization request message including the digital signature causes an acquirer system to transmit the transaction authorization request message to the transaction service provider system without modifying the transaction authorization request message.

Clause 4: The method of any of clauses 1-3, further comprising: verifying an authenticity of the transaction authorization response message using a public key of the transaction service provider system.

Clause 5: The method of any of clauses 1-4, further comprising: generating a certification message, wherein the certification message comprises a payload associated with a specification of the transaction service provider system; and transmitting the certification message to the transaction service provider system without transmitting the certification message to an acquirer system.

Clause 6: The method of any of clauses 1-5, wherein the payload associated with the electronic funds transfer at the POS device is a first payload, and wherein generating the transaction authorization request message comprises: generating the first payload associated with the electronic funds transfer at the POS device; and generating a second payload associated with an acquirer system, wherein the transaction authorization request message comprises the first payload associated with the electronic funds transfer at the POS device and the second payload associated with the acquirer system, and wherein inserting the digital signature for the first payload into the transaction authorization request message comprises: inserting the first payload associated with the electronic funds transfer at the POS device and the digital signature for the first payload into the second payload associated with the acquirer system.

Clause 7: The method of any of clauses 1-6, wherein generating the transaction authorization request message comprises: appending the digital signature for the payload associated with the electronic funds transfer at the POS device to the payload associated with the electronic funds transfer at the POS device to create a signed certified payload, and wherein inserting the digital signature for the payload into the transaction authorization request message comprises: inserting the digital signature for the signed certified payload into the transaction authorization request message.

Clause 8: The method of any of clauses 1-7, further comprising: extracting the signed certified payload from the transaction authorization request message; and transmitting the signed certified payload to the transaction service provider system.

Clause 9: A system for conducting a payment transaction to ensure data integrity of the payment transaction, comprising: at least one processor programmed or configured to:

generate a transaction authorization request message, wherein the transaction authorization request message comprises a payload associated with an electronic funds transfer at a point-of-sale (POS) device, wherein when generating the transaction authorization request message, the at least one processor is programmed or configured to: generate a digital signature for the payload using a private key of a payment gateway system; and insert the digital signature for the payload into the transaction authorization request message; transmit the transaction authorization request message including the digital signature; receive a transaction authorization response message; and verify an authenticity of the transaction authorization response message.

Clause 10: The system of clause 9, wherein, when verifying the authenticity of the transaction authorization response message, the at least one processor is programmed or configured to: verify the authenticity of the transaction authorization response message using a public key of a transaction service provider system.

Clause 11: The system of clauses 9 or 10, wherein the at least one processor is further programmed or configured to: generate a certification message, wherein the certification message comprises a payload associated with a specification of a transaction service provider system; and transmit the certification message to the transaction service provider system without transmitting the certification message to an acquirer system.

Clause 12: The system of any of clauses 9-11, wherein the at least one processor is further programmed or configured to: transmit the transaction authorization request message to a transaction service provider system without modifying the transaction authorization request message.

Clause 13: The system of any of clauses 9-12, wherein the payload associated with the electronic funds transfer at the POS device is a first payload, and wherein, when generating the transaction authorization request message, the at least one processor is programmed or configured to: generate the first payload associated with the electronic funds transfer at the POS device; and generate a second payload associated with an acquirer system, wherein the transaction authorization request message comprises the first payload associated with the electronic funds transfer at the POS device and the second payload associated with the acquirer system, and wherein, when inserting the digital signature for the first payload into the transaction authorization request message, the at least one processor is programmed or configured to: insert the first payload associated with the electronic funds transfer at the POS device and the digital signature for the first payload into the second payload associated with the acquirer system.

Clause 14: The system of any of clauses 9-13, wherein, when generating the transaction authorization request message, the at least one processor is programmed or configured to: append the digital signature for the payload associated with the electronic funds transfer at the POS device to the payload associated with the electronic funds transfer at the POS device to create a signed certified payload; and wherein the at least one processor is further programmed or configured to: extract the signed certified payload from the transaction authorization request message; and transmit the signed certified payload to a transaction service provider system.

Clause 15: A computer program product for conducting a payment transaction to ensure data integrity of the payment transaction, comprising at least one non-transitory computer-readable medium comprising one or more instructions that, when executed by at least one processor, cause the at least one processor to: generate a transaction authorization request message, wherein the transaction authorization request message comprises a payload associated with an electronic funds transfer at a point-of-sale (POS) device, wherein the one or more instructions that cause the at least one processor to generate the transaction authorization request message, cause the at least one processor to: generate a digital signature for the payload using a private key of a payment gateway system; and insert the digital signature for the payload into the transaction authorization request message; transmit the transaction authorization request message including the digital signature; and receive a transaction authorization response message from a transaction service provider system.

Clause 16: The computer program product of clause 15, wherein, when verifying the authenticity of the transaction authorization response message, the at least one processor is programmed or configured to: verify the authenticity of the transaction authorization response message using a public key of the transaction service provider system.

Clause 17: The computer program product of clauses 15 or 16, wherein the one or more instructions further cause the at least one processor to: generate a certification message, wherein the certification message comprises a payload associated with a specification of the transaction service provider system; and transmit the certification message to the transaction service provider system without transmitting the certification message to an acquirer system.

Clause 18: The computer program product of any of clauses 15-17, wherein the one or more instructions further cause the at least one processor to: transmit the transaction authorization request message to the transaction service provider system without modifying the transaction authorization request message.

Clause 19: The computer program product of any of clauses 15-18, wherein the payload associated with the electronic funds transfer at the POS device is a first payload, and wherein, the one or more instructions that cause the at least one processor to generate the transaction authorization request message, cause the at least one processor to: generate the first payload associated with the electronic funds transfer at the POS device; and generate a second payload associated with an acquirer system, wherein the transaction authorization request message comprises the first payload associated with the electronic funds transfer at the POS device and the second payload associated with the acquirer system, and wherein, the one or more instructions that cause the at least one processor to insert the digital signature for the first payload into the transaction authorization request message, cause the at least one processor to: insert the first payload associated with the electronic funds transfer at the POS device and the digital signature for the first payload into the second payload associated with the acquirer system.

Clause 20: The computer program product of any of clauses 15-19, wherein, the one or more instructions that cause the at least one processor to generate the transaction authorization request message, cause the at least one processor to: append the digital signature for the payload associated with the electronic funds transfer at the POS device to the payload associated with the electronic funds transfer at the POS device to create a signed certified payload.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this written description, wherein like reference numerals designate corresponding parts in the various figures. It is to be expressly understood, however, that the drawings are for the purpose of illustration and description only and are not intended as a definition of the limits of the present disclosure. As used in the written description and the claims, the singular form of "a," "an," and "the" include plural referents unless the context clearly dictates otherwise.

BRIEF DESCRIPTION OF THE DRAWINGS

Additional advantages and details of the present disclosure are explained in greater detail below with reference to the exemplary embodiments that are illustrated in the accompanying schematic figures, in which:

FIGS. 5A-5F are diagrams of an implementation of a non-limiting embodiment of a process for conducting a payment transaction to ensure data integrity of the payment transaction.

DETAILED DESCRIPTION

Figure 1:
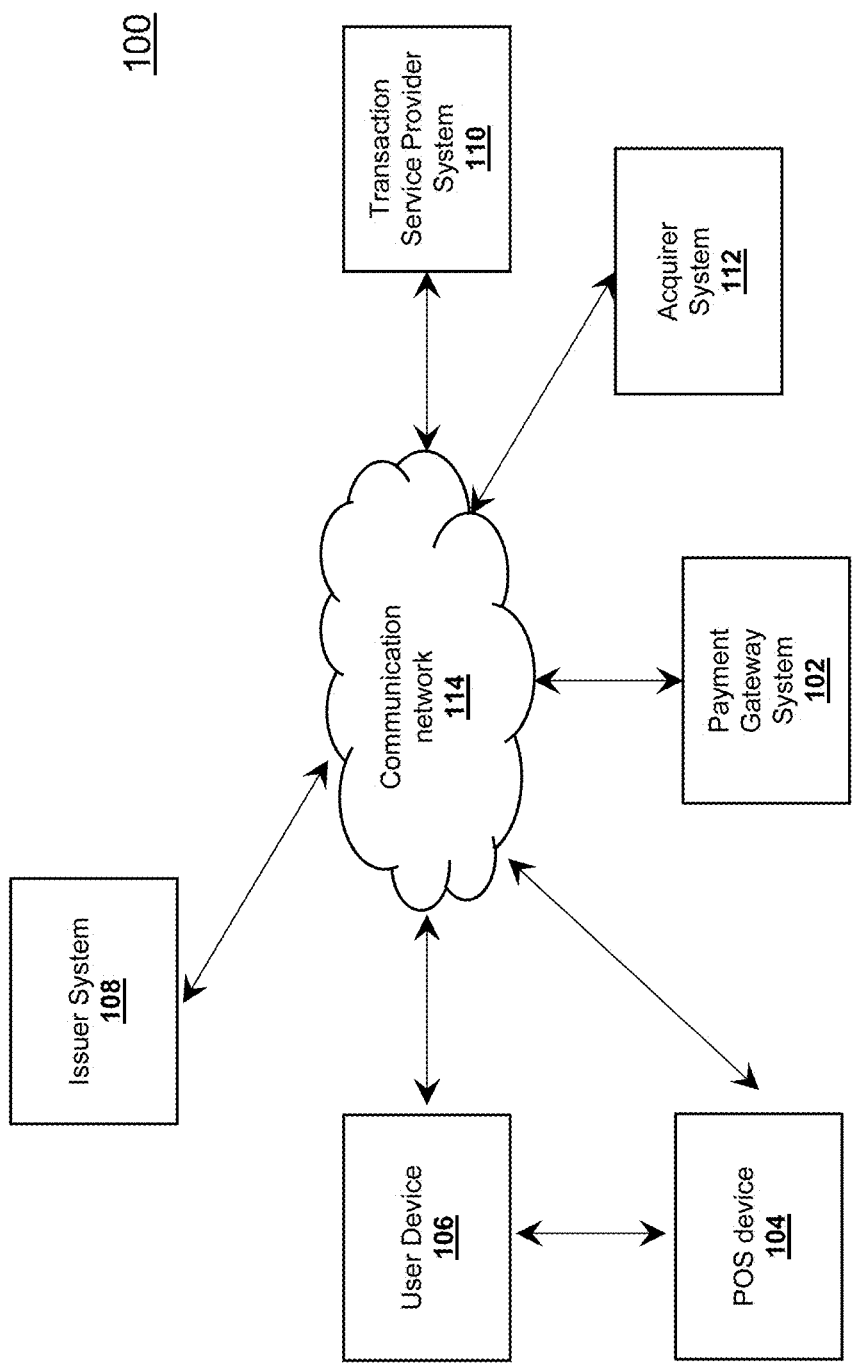
FIG. 1 is a diagram of a non-limiting embodiment of an environment in which systems, devices, products, apparatus, and/or methods, described herein, may be implemented according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the present disclosure as it is oriented in the drawing figures. However, it is to be understood that the present disclosure may assume various alternative variations and step sequences, except where expressly specified to the contrary. It is also to be understood that the specific devices and processes illustrated in the attached drawings, and described in the following written description, are simply exemplary embodiments or aspects of the present disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet and/or the like) that includes data. It will be appreciated that numerous other arrangements are possible.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a portable financial device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes. An issuer institution may be associated with a bank identification number (BIN) that uniquely identifies it.

As used herein, the term "account identifier" may include one or more types of identifiers associated with a user account (e.g., a PAN, a card number, a payment card number, a token, and/or the like). In some non-limiting embodiments, an issuer institution may provide an account identifier (e.g., a PAN, a token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments, the account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of identifier. Account identifiers may be alphanumeric, any combination of characters and/or symbols, and/or the like.

As used herein, the term "token" may refer to an identifier that is used as a substitute or replacement identifier for an account identifier, such as a PAN. Tokens may be associated with a PAN or other account identifiers in one or more data structures such that they can be used to conduct a transaction (e.g., a payment transaction) without directly using the account identifier, such as a PAN. In some examples, an account identifier, such as a PAN, may be associated with a plurality of tokens for different uses or different purposes.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein, the term "merchant system" may refer to one or more computer systems operated by or on behalf of a merchant, such as a server computer executing one or more software applications. As used herein, the term "product" may refer to one or more goods and/or services offered by a merchant.

As used herein, the term "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, the term "transaction service provider" may refer to an entity that receives transaction authorization requests from merchants or other entities and provides guarantees of payment, in some cases through an agreement between the transaction service provider and an issuer institution. In some non-limiting embodiments, a transaction service provider may include a credit card company, a debit card company, a payment network such as Visa®, MasterCard®, American Express®, or any other entity that processes transaction. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments, may be operated by or on behalf of a transaction service provider.

As used herein, the term "acquirer" may refer to an entity licensed by the transaction service provider and approved by the transaction service provider to originate transactions (e.g., payment transactions) using a portable financial device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitator, and/or the like. In some non-limiting embodiments, an acquirer may be a financial institution, such as a bank.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "portable financial device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway and/or to a payment gateway itself. The term "payment gateway mobile application" may refer to one or more electronic devices and/or one or more software applications configured to provide payment services for transactions (e.g., payment transactions, electronic payment transactions, and/or the like).

As used herein, the term "client device" may refer to one or more devices (e.g., client-side devices) or one or more systems (e.g., client-side systems), which are remote from a server, used to access a functionality provided by the server. For example, a client device may include one or more computing devices such as one or more computers, computing machines, processors, electronic computers, information processing systems, portable computers, tablet computers, cellular phones, smartphones, wearable devices (e.g., watches, glasses, lenses, clothing, and/or the like), PDAs, and/or the like.

As used herein, the term "server" may refer to one or more devices that provide a functionality to one or more devices (e.g., one or more client devices) via a network (e.g., a public network, a private network, the Internet, and/or the like). For example, a server may include one or more computing devices.

As used herein, the term "system" may refer to one or more devices, such as one or more processors, servers, client devices, computing devices that include software applications, and/or the like.

In some non-limiting embodiments, reference to "a server" or "a processor," as used herein, may refer to a previously-recited server and/or processor that is recited as performing a previous step or function, a different server and/or processor, and/or a combination of servers and/or processors. For example, as used in the written description and the claims, a first server and/or a first processor that is recited as performing a first step or function may refer to the same or different server and/or a processor recited as performing a second step or function.

Non-limiting embodiments of the present disclosure are directed to systems, methods, and computer program products for conducting a payment transaction involving a payment gateway system to ensure data integrity. In some non-limiting embodiments, a computer-implemented method may include a payment gateway system generating a transaction authorization request message, where the transaction authorization request message comprises a payload associated with an electronic funds transfer at a POS device.

In some non-limiting embodiments, generating the transaction message may include generating a digital signature for the payload using a private key of a payment gateway system and inserting the digital signature for the payload into the transaction authorization request message. The method may further include the payment gateway system transmitting the transaction authorization request message including the digital signature, and receiving a transaction authorization response message from a transaction service provider system. In some non-limiting embodiments, the method may further include generating a certification message that includes a payload associated with a specification of the transaction service provider system and transmitting the certification message to the transaction service provider system without transmitting the certification message to an acquirer system.

In this way, the payment gateway system may be able to eliminate the need for other entities to be involved in the certification process (e.g., a process for certifying a POS device prior to using the POS device to conduct a real-time payment transaction) and/or a production process (e.g., a process that involves using a POS device to conduct real-time payment transactions) for processing payment transactions that is based on the certification process. In addition, the payment gateway system may be able to more accurately ensure that data integrity is maintained during a payment transaction and to reduce the amount of network resources expended during the certification process and/or the production process for processing payment transactions that is based on the certification process.

Referring now to FIG. 1, FIG. 1 is a diagram of an example environment 100 in which devices, systems, and/or methods, described herein, may be implemented. As shown in FIG. 1, environment 100 includes payment gateway system 102, POS device 104, user device 106, issuer system 108, transaction service provider system 110, acquirer system 112, and communication network 114. Payment gateway system 102, POS device 104, user device 106, issuer system 108, transaction service provider system 110, and/or acquirer system 112, may interconnect (e.g., establish a connection to communicate) via wired connections, wireless connections, or a combination of wired and wireless connections.

Payment gateway system 102 may include one or more devices capable of receiving information from and/or transmitting information to POS device 104, user device 106, issuer system 108, transaction service provider system 110, and/or acquirer system 112 via communication network 114. For example, payment gateway system 102 may include a computing device, such as a server (e.g., a transaction processing server), a group of servers, and/or other like devices. In some non-limiting embodiments, payment gateway system 102 may be associated with a payment gateway as described herein.

POS device 104 may include one or more devices capable of receiving information from and/or transmitting information to payment gateway system 102, user device 106, issuer system 108, transaction service provider system 110, and/or acquirer system 112 via communication network 114. For example, POS device 104 may include a computing device and/or other like devices. POS device 104 may also include a device capable of receiving information from user device 106 via communication network 114, a communication connection (e.g., an NFC communication connection, an RFID communication connection, a Bluetooth® communication connection, and/or the like) with user device 106, and/or the like, and/or transmitting information to user device 106 via communication network 114, the communication connection, and/or the like. In some non-limiting embodiments, POS device 104 may be a component of a merchant system associated with a merchant, as described herein. In some non-limiting embodiments, POS device 104 may include one or more user devices 106. In some non-limiting embodiments, POS device 104 may include one or more devices, such as computers, computer systems, and/or peripheral devices capable of being used by a merchant to conduct a payment transaction with a user. For example, POS device 104 may include a POS terminal.

User device 106 may include one or more devices capable of receiving information from and/or transmitting information to payment gateway system 102, POS device 104, issuer system 108, transaction service provider system 110, acquirer system 112 via communication network 114. For example, user device 106 may include a computing device and/or other like devices. In some non-limiting embodiments, user device 106 may or may not be capable of receiving information (e.g., from POS device 104) via a short range wireless communication connection (e.g., an NFC communication connection, an RFID communication connection, a Bluetooth® communication connection, and/or the like) and/or transmitting information (e.g., to POS device 104) via a short range wireless communication connection.

Issuer system 108 may include one or more devices capable of receiving information from and/or transmitting information to payment gateway system 102, POS device 104, user device 106, transaction service provider system 110, and/or acquirer system 112 via communication network 114. For example, issuer system 108 may include a computing device, such as a server, a group of servers, and/or other like devices. In some non-limiting embodiments, issuer system 108 may be associated with an issuer institution, as described herein. For example, issuer system 108 may be associated with an issuer institution that issued a credit account, debit account, credit card account, debit card account, and/or the like to a user associated with user device 106.

Transaction service provider system 110 may include one or more devices capable of receiving information from and/or transmitting information to payment gateway system 102, POS device 104, user device 106, issuer system 108, and/or acquirer system 112 via communication network 114. For example, transaction service provider system 110 may include a computing device, such as a server (e.g., a transaction processing server), a group of servers, and/or other like devices. In some non-limiting embodiments, transaction service provider system 110 may be associated with a transaction service provider, as described herein. In some non-limiting embodiments, transaction service provider system 110 may be in communication with a data storage device, which may be local or remote to the transaction service provider system 110. In some non-limiting embodiments, transaction service provider system 110 may be capable of receiving information from, storing information in, transmitting information to, or searching information stored in a data storage device.

Acquirer system 112 may include one or more devices capable of receiving information from and/or transmitting information to payment gateway system 102, POS device 104, user device 106, issuer system 108, transaction service provider system 110 via communication network 114. For example, acquirer system 112 may include a computing device, such as a server, a group of servers, and/or other like devices. In some non-limiting embodiments, acquirer system 112 may be associated with an acquirer, as described herein. In some non-limiting embodiments, acquirer system 112 may be associated with a merchant account of a merchant associated with POS device 104.

Communication network 114 may include one or more wired and/or wireless networks. For example, communication network 114 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally or alternatively, a set of devices (e.g., one or more devices) of environment 100 may perform one or more functions described as being performed by another set of devices of environment 100.

Figure 2:
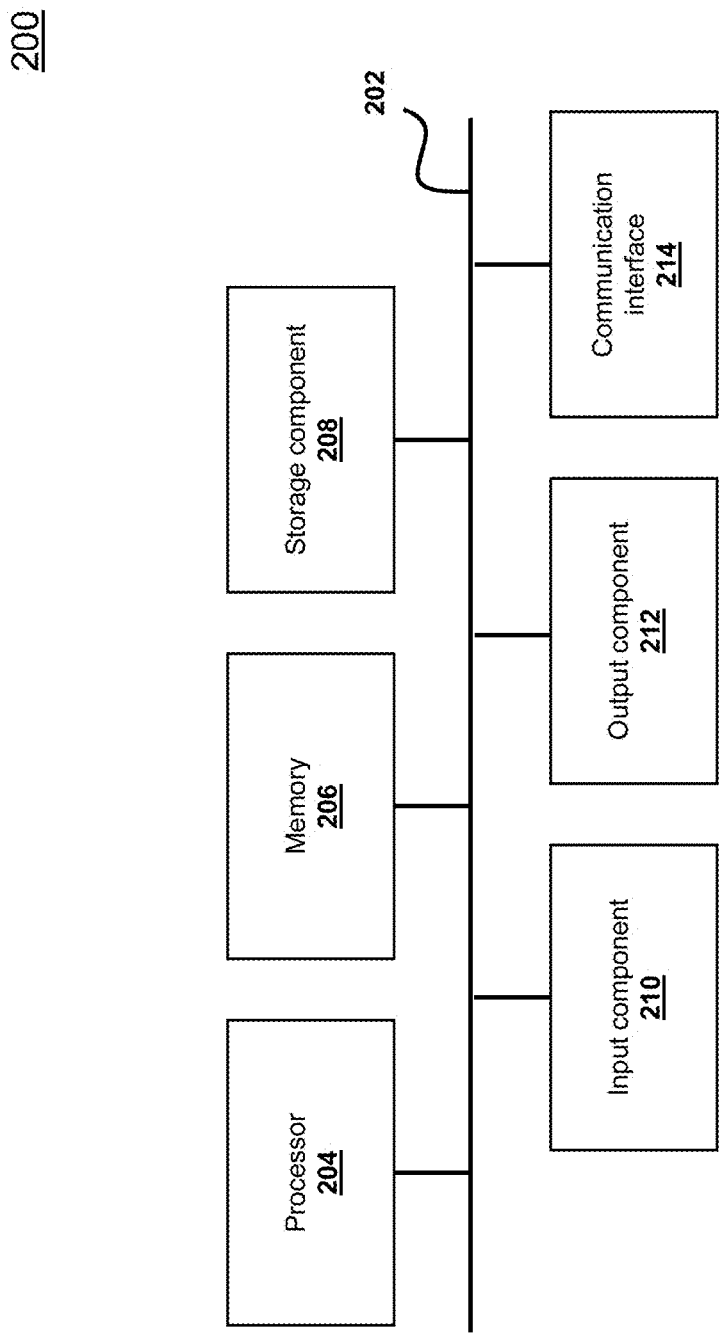
FIG. 2 is a diagram of a non-limiting embodiment of components of one or more devices of FIG. 1.

Referring now to FIG. 2, FIG. 2 is a diagram of example components of a device 200. Device 200 may correspond to payment gateway system 102 (e.g., one or more devices of payment gateway system 102), POS device 104, user device 106, issuer system 108 (e.g., one or more devices of issuer system 108), transaction service provider system 110 (e.g., one or more devices of transaction service provider system 110), and/or acquirer system 112 (e.g., one or more devices of acquirer system 112). In some non-limiting embodiments, payment gateway system 102, POS device 104, user device 106, issuer system 108, transaction service provider system 110, and/or acquirer system 112 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage memory (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
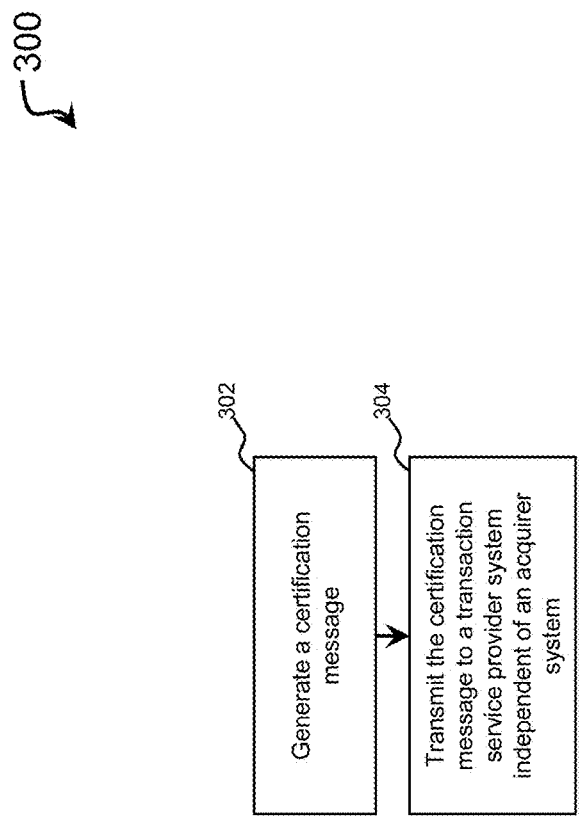
FIG. 3 is a flowchart of a non-limiting embodiment of a process for certifying a point-of-sale (POS) device to conduct a payment transaction.

Referring now to FIG. 3, FIG. 3 is a flowchart of a non-limiting embodiment of a process 300 for certifying a POS device to conduct a payment transaction. In some non-limiting embodiments, one or more of the steps of process 300 may be performed (e.g., completely, partially, etc.) by payment gateway system 102 (e.g., one or more devices of payment gateway system 102). In some non-limiting embodiments, one or more of the steps of process 300 may be performed (e.g., completely, partially, etc.) by another device or a group of devices separate from or including payment gateway system 102 (e.g., one or more devices of payment gateway system 102), POS device 104 (e.g., one or more devices of POS device 104), user device 106, issuer system 108 (e.g., one or more devices of issuer system 108), transaction service provider system 110 (e.g., one or more devices of transaction service provider system 110), and/or acquirer system 112 (e.g., one or more devices of acquirer system 112).

As shown in FIG. 3, at step 302, process 300 includes generating a certification message. For example, during a certification process of POS device 104, payment gateway system 102 may generate the certification message associated with certifying POS device 104 to process a payment transaction with transaction service provider system 110. In some non-limiting embodiments, the certification message may be a message that is based on a specification that is required by transaction service provider system 110. For example, the certification message may include a payload associated with a specification of transaction service provider system 110. The certification message may include a payload associated with a specification of transaction service provider system 110. In some non-limiting embodiments, the certification message may include a payload that is formatted according to a specification for a transaction authorization request message that is required by transaction service provider system 110 to process a payment transaction (e.g., a payment transaction during the processing of which the transaction authorization request message is transmitted to transaction service provider system 110).

In some non-limiting embodiments, the certification message may include a payload that is formatted according to an ISO network message. For example, the certification message may include a payload that is formatted according to an ISO standard, such as an ISO 8583 standard, an ISO 20022 standard, and/or the like.

In some non-limiting embodiments, payment gateway system 102 may generate the certification message associated with certifying POS device 104 to conduct a payment transaction based on an Europay, Mastercard, and Visa (EMV) kernel of POS device 104. For example, payment gateway system 102 may generate the certification message so that the certification message includes a payload that includes data associated with the EMV kernel of POS device 104. In some non-limiting embodiments, an EMV kernel may include a set of functions that provide processing logic that is required to allow a POS device to perform processing of a payment transaction according to an EMV specification (e.g., a specification for an EMV contact transaction and/or a specification for an EMV contactless transaction). In this way, payment gateway system 102 may generate the certification message that is used to certify any POS device that uses the EMV kernel of POS device 104. Accordingly, payment gateway system 102 may reduce the processing resources as compared to a scenario where certification messages are generated for each POS device of a plurality of POS devices.

In some non-limiting embodiments, POS device 104 may generate an initial certification message associated with certifying POS device 104 to conduct a payment transaction based on an EMV kernel of POS device 104. For example, POS device 104 may generate the initial certification message so that the certification message includes a payload that includes data associated with the EMV kernel of POS device 104. In some non-limiting embodiments, the initial certification message may have the same format as a certification message that is generated by or transmitted by payment gateway system 102 during the certification process of POS device 104. In some non-limiting embodiments, during a certification process of POS device 104, POS device 104 may transmit the initial certification message to payment gateway system 102. In some non-limiting embodiments, payment gateway system 102 may generate the certification message associated with certifying POS device 104 to conduct a payment transaction based on receiving the initial certification message from POS device 104.

As shown in FIG. 3, at step 304, process 300 includes transmitting the certification message to a transaction service provider system independent of an acquirer system. For example, during the certification process of POS device 104, payment gateway system 102 may transmit the certification message (e.g., the certification message associated with certifying POS device 104 to process a payment transaction with transaction service provider system 110) to transaction service provider system 110 without transmitting the certification message to acquirer system 112 (e.g., acquirer system 112 associated with a merchant system, the merchant system of which POS device 104 is a component). In this way, payment gateway system 102 may reduce networking resources that are consumed as compared to a scenario where the certification message is transmitted to acquirer system 112 and acquirer system 112 transmits the certification message to transaction service provider system 110.

In some non-limiting embodiments, transaction service provider system 110 may store data included in the certification message. For example, transaction service provider system 110 may store data associated with the EMV kernel of POS device 104 based on receiving the certification message. In some non-limiting embodiments, transaction service provider system 110 may determine that POS device 104 is certified. In this way, transaction service provider system 110 may determine that a message (e.g., a transaction authorization request message) from payment gateway system 102 that is received during a payment transaction involving POS device 104 will be of the same format as the certification message. In some non-limiting embodiments, transaction service provider system 110 may determine that a format of the certification message (e.g., a format of a payload of the certification message) corresponds to a format of a message that is acceptable to transaction service provider system 110.

In some non-limiting embodiments, during the certification process of POS device 104, payment gateway system 102 may transmit a public key of a private/public key pair of payment gateway system 102 to transaction service provider system 110. For example, payment gateway system 102 may include the public key of the private/public key pair of payment gateway system 102 in the certification message and payment gateway system 102 may transmit the certification message to transaction service provider system 110. In some non-limiting embodiments, payment gateway system 102 may transmit the public key of the private/public key pair to transaction service provider system 110 separate from the certification message.

In some non-limiting embodiments, payment gateway system 102 may receive a public key of a private/public key pair of transaction service provider system 110 from transaction service provider system 110. For example, payment gateway system 102 may receive the public key of the private/public key pair of transaction service provider system 110 included in a certification response message from transaction service provider system 110. In some non-limiting embodiments, payment gateway system 102 may receive a confirmation message from transaction service provider system 110. For example, transaction service provider 110 may generate the confirmation message based on determining that the payload of the certification message received from payment gateway system 102 is formatted according to a specification of transaction service provider system 110 (e.g., is formatted to an ISO message specification of transaction service provider system 110) and transaction service provider 110 may transmit the confirmation message to payment gateway system 102 and payment gateway system 102 may receive the confirmation message.

In some non-limiting embodiments, the confirmation message may include an indication that the payload of the certification message received from payment gateway system 102 is formatted according to a specification of transaction service provider system 110. In some non-limiting embodiments, payment gateway system 102 may determine that the payload of the certification message has been certified by transaction service provider 110 based on the indication.

Figure 4:
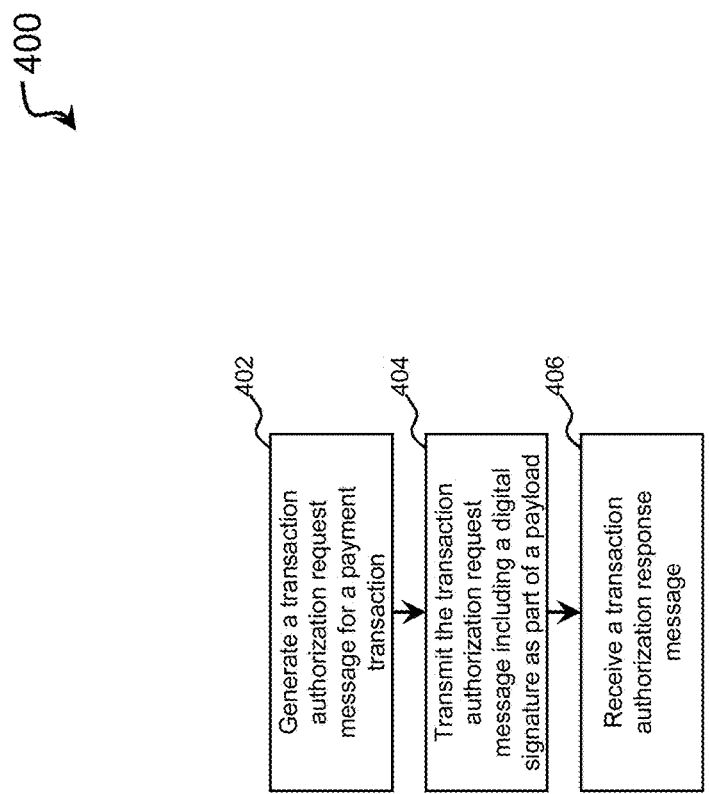
FIG. 4 is a flowchart of a non-limiting embodiment of a process for conducting a payment transaction involving a certified POS device.

Referring now to FIG. 4, FIG. 4 is a flowchart of a non-limiting embodiment of a process 400 for conducting a payment transaction involving a certified POS device. In some non-limiting embodiments, one or more of the steps of process 400 may be performed (e.g., completely, partially, etc.) by payment gateway system 102 (e.g., one or more devices of payment gateway system 102). In some non-limiting embodiments, one or more of the steps of process 400 may be performed (e.g., completely, partially, etc.) by another device or a group of devices separate from or including payment gateway system 102 (e.g., one or more devices of payment gateway system 102), POS device 104 (e.g., one or more devices of POS device 104), user device 106, issuer system 108 (e.g., one or more devices of issuer system 108), transaction service provider system 110 (e.g., one or more devices of transaction service provider system 110), and/or acquirer system 112 (e.g., one or more devices of acquirer system 112).

As shown in FIG. 4, at step 402, process 400 includes generating a transaction authorization request message for a payment transaction. For example, during a production process, payment gateway system 102 may generate the transaction authorization request message for a payment transaction involving POS device 104 (e.g., a payment transaction involving a customer associated with user device 106 and a merchant associated with POS device 104). In some non-limiting embodiments, payment gateway system 102 may generate the transaction authorization request message based on receiving an initial transaction authorization request message for the payment transaction from POS device 104. In some non-limiting embodiments, payment gateway system 102 may generate the transaction authorization request message so that a format of the transaction authorization request message is the same as a format of a certification message received during a certification process for POS device 104.

In some non-limiting embodiments, the transaction authorization request message may be a message that is based on a specification that is required by transaction service provider system 110. In some non-limiting embodiments, the transaction authorization request message may include a payload associated with an electronic funds transfer at POS device 104 for the payment transaction. For example, the payload may include transaction data associated with a payment transaction conducted involving POS device 104. In some non-limiting embodiments, the payload may be associated with a data format, such as a JSON data format. In some non-limiting embodiments, the data format associated with the payload may be based on an application programming interface (API) of payment gateway system 102, POS device 104, issuer system 108, transaction service provider system 110, and/or acquirer system 112.

In some non-limiting embodiments, payment gateway system 102 may generate the transaction authorization request message by generating a digital signature for the payload using a private key of payment gateway system 102 and inserting the digital signature for the payload into the transaction authorization request message.

In some non-limiting embodiments, the payload of the transaction authorization request message may be associated with a specification that is required by transaction service provider system 110. For example, the payload of the transaction authorization request message may be formatted according to a specification of transaction service provider system 110, such as payload associated with an ISO network message. In some non-limiting embodiments, the transaction authorization request message may include a payload that is formatted according to an ISO standard, such as an ISO 8583 standard, an ISO 20022 standard, and/or the like. In some non-limiting embodiments, the payload of the transaction authorization request message may be a pre-certified payload. For example, the payload of the transaction authorization request message may be the pre-certified payload that is formatted according to a specification of transaction service provider system 110 that was determined to be certified by transaction service provider system 110 during a certification process.

In some non-limiting embodiments, the digital signature may be generated using a digital signature algorithm, such as an RSA algorithm. In some non-limiting embodiments, the digital signature may be generated by payment gateway system 102 using a private key, such as a private key of payment gateway system 102. In some non-limiting embodiments, payment gateway system 102 may append the digital signature for the payload to the payload.

In some non-limiting embodiments, the payload associated with an electronic funds transfer at a POS device may be generated by POS device 104 (e.g., by a POS device of POS device 104). For example, the payload may be generated by a POS device of POS device 104 during a payment transaction involving a merchant associated with POS device 104. In some non-limiting embodiments, a payload associated with acquirer system 112 may be generated by POS device 104 or payment gateway system 102. In some non-limiting embodiments, payment gateway system 102 may insert a first payload associated with the electronic funds transfer at a POS device and a digital signature for a first payload into a second payload associated with acquirer system 112. In some non-limiting embodiments, the transaction authorization request message may include the first payload associated with the electronic funds transfer at POS device 104 and the second payload associated with acquirer system 112. For example, payment gateway system 102 may generate the transaction authorization request message, which may include the first payload associated with the electronic funds transfer at POS device 104 and the second payload associated with acquirer system 112.

In some non-limiting embodiments, payment gateway system 102 may append a digital signature to the payload associated with the electronic funds transfer at POS device 104 (e.g., an ISO payload for an authorization request for a payment transaction conducted involving POS device 104) to create a signed certified payload (e.g., a digitally signed pre-certified payload, which may include a payload that has been certified by transaction service provider system 110 and that has been digitally signed by payment gateway system 102). For example, payment gateway system 102 may append the digital signature to an ISO payload by inserting the digital signature into a bitmap of a message (e.g., a bitmap of a message, such as a transaction authorization request message, that is unused according to an ISO standard for the message) to create the signed certified payload. In some non-limiting embodiments, payment gateway system 102 may insert the signed certified payload into a transaction authorization request message. For example, payment gateway system 102 may append the digital signature to the ISO payload to create the signed certified payload and insert the signed certified payload into the transaction authorization request message. In some non-limiting embodiments, payment gateway system 102 may transmit the signed certified payload to transaction service provider system 110 and/or acquirer system 112. For example, payment gateway system 102 may transmit the signed certified payload independent of (e.g., without) data associated with acquirer system 112. In some non-limiting embodiments, payment gateway system 102 may transmit the signed certified payload independent of data associated with acquirer system 112 to acquirer system 112. In some non-limiting embodiments, payment gateway system 102 may transmit the signed certified payload independent of data associated with acquirer system 112 (e.g., data associated with an acquirer payload, an acquirer payload, and/or the like) that may be included in a message based on an ISO standard.

As further shown in FIG. 4, at step 404, process 400 includes transmitting the transaction authorization request message including a digital signature. For example, during a production process, payment gateway system 102 may transmit the transaction authorization request message including the digital signature to acquirer system 112. The electronic funds transfer may be associated with a payment transaction that is conducted involving POS device 104 (e.g., a payment transaction conducted between a merchant associated with POS device 104 and a consumer associated with user device 106). In some non-limiting embodiments, payment gateway system 102 may transmit the transaction authorization request message including the digital signature as part of a payload (e.g., a signed certified payload) of the transaction authorization request message.

In some non-limiting embodiments, payment gateway system 102 may transmit the transaction authorization request message including the digital signature to transaction service provider system 110. For example, during a production process, payment gateway system 102 may transmit the transaction authorization request message including the digital signature to transaction service provider system 110 independent of (e.g., without) transmitting the transaction authorization request message to acquirer system 112.

In some non-limiting embodiments, payment gateway system 102 may transmit the signed certified payload of the transaction authorization request message to transaction service provider system 110 so that the signed certified payload is not modified prior to transaction service provider system 110 receiving the signed certified payload.

In some non-limiting embodiments, payment gateway system 102 may transmit the transaction authorization request message including the digital signature to acquirer system 112. For example, during a production process (e.g., a real-time process for processing a payment transaction), payment gateway system 102 may transmit the transaction authorization request message including the digital signature to acquirer system 112. In some non-limiting embodiments, acquirer system 112 may receive the transaction authorization request message and acquirer system 112 may transmit the transaction authorization request message to transaction service provider system 110 without modifying the transaction authorization request message. For example, during a production process, acquirer system 112 may receive the transaction authorization request message and based on receiving the transaction authorization request message, acquirer system 112 may transmit the transaction authorization request message to transaction service provider system 110 without modifying the transaction authorization request message. In some non-limiting embodiments, the transaction authorization request message may cause acquirer system 112 to transmit the transaction authorization request message to transaction service provider system 110 without modifying the transaction authorization request message.

In some non-limiting embodiments, payment gateway system 102 may transmit a payload (e.g., a payload associated with ISO standard, such as an ISO 8583 standard) or the payload and a digital signature for the payload. For example, during a production process, payment gateway system 102 may transmit the payload or the payload and the digital signature for the payload to transaction service provider system 110 independent of transmitting the payload or the payload and the digital signature for the payload to acquirer system 112. In another example, during a production process, payment gateway system 102 may transmit the payload or the payload and the digital signature for the payload to acquirer system 112. In this way, payment gateway system 102 may provide a way for transaction service provider system 110 to determine whether data integrity of the transaction authorization request message has been maintained.

In some non-limiting embodiments, acquirer system 112 may extract a signed certified payload from a transaction authorization request message. For example, acquirer system 112 may extract the signed certified payload from the transaction authorization request message received from payment gateway system 102. In some non-limiting embodiments, acquirer system 112 may transmit the signed certified payload to transaction service provider system 110. For example, acquirer system 112 may transmit the signed certified payload to transaction service provider system 110 based on extracting the signed certified payload from the transaction authorization request message.

In some non-limiting embodiments, transaction service provider system 110 may verify authenticity of the transaction authorization request message using a public key of payment gateway system 102. For example, transaction service provider system 110 may verify that the transaction authorization request message was generated and transmitted by payment gateway system 102 without modification using the public key of payment gateway system 102.

As further shown in FIG. 4, at step 406, process 400 includes receiving a transaction authorization response message. For example, during a production process, payment gateway system 102 may receive the transaction authorization response message from transaction service provider system 110. In some non-limiting embodiments, payment gateway system 102 may receive the transaction authorization response message from transaction service provider system 110 via acquirer system 112. For example, transaction service provider system 110 may transmit the transaction authorization response message to acquirer system 112 and acquirer system 112 may transmit the transaction authorization response message to payment gateway system 102.

In some non-limiting embodiments, the transaction authorization response message may include a digital signature of transaction service provider system 110. For example, the transaction authorization response message may include a digital signature as part of a payload (e.g., a signed certified payload) of the transaction authorization response message. In some non-limiting embodiments, the digital signature may have been generated by transaction service provider system 110 using a private key of transaction service provider system 110.

In some non-limiting embodiments, transaction service provider system 110 may append a digital signature to the payload associated with a response for the electronic funds transfer at POS device 104 (e.g., an ISO payload for an authorization response for a payment transaction conducted involving POS device 104) to create a signed certified payload (e.g., a digitally signed pre-certified payload, which includes a payload that has been certified by transaction service provider system 110 and that has been digitally signed by transaction service provider system 110). For example, transaction service provider system 110 may append the digital signature to an ISO payload by inserting the digital signature into a bitmap of a message (e.g., a bitmap of a message, such as a transaction authorization response message, that is unused according to an ISO standard for the message) to create the signed certified payload. In some non-limiting embodiments, transaction service provider system 110 may insert the digital signature of the signed certified payload into a transaction authorization response message. In some non-limiting embodiments, transaction service provider system 110 may transmit the signed certified payload to payment gateway system 102 and/or acquirer system 112.

In some non-limiting embodiments, payment gateway system 102 may verify authenticity of the transaction authorization response message using a public key of transaction service provider system 110. For example, payment gateway system 102 may verify that the transaction authorization response message was generated and transmitted by transaction service provider system 110 without modification using the public key of transaction service provider system 110. In this way, payment gateway system 102 may determine whether data integrity of the transaction authorization response message has been maintained. In some non-limiting embodiments, payment gateway system 102 may transmit the transaction authorization response message to POS device 104. For example, payment gateway system 102 may transmit the transaction authorization response message to POS device 104 based on verifying that the transaction authorization response message was generated and transmitted by transaction service provider system 110 without modification.

FIGS. 5A-5F are diagrams of an implementation of a non-limiting embodiment of a process 500 for conducting a payment transaction to ensure data integrity of the payment transaction. As shown in FIGS. 5A-5F, implementation 500 may include payment gateway system 102, POS device 104, transaction service provider system 110, and acquirer system 112.

Figure 5A:
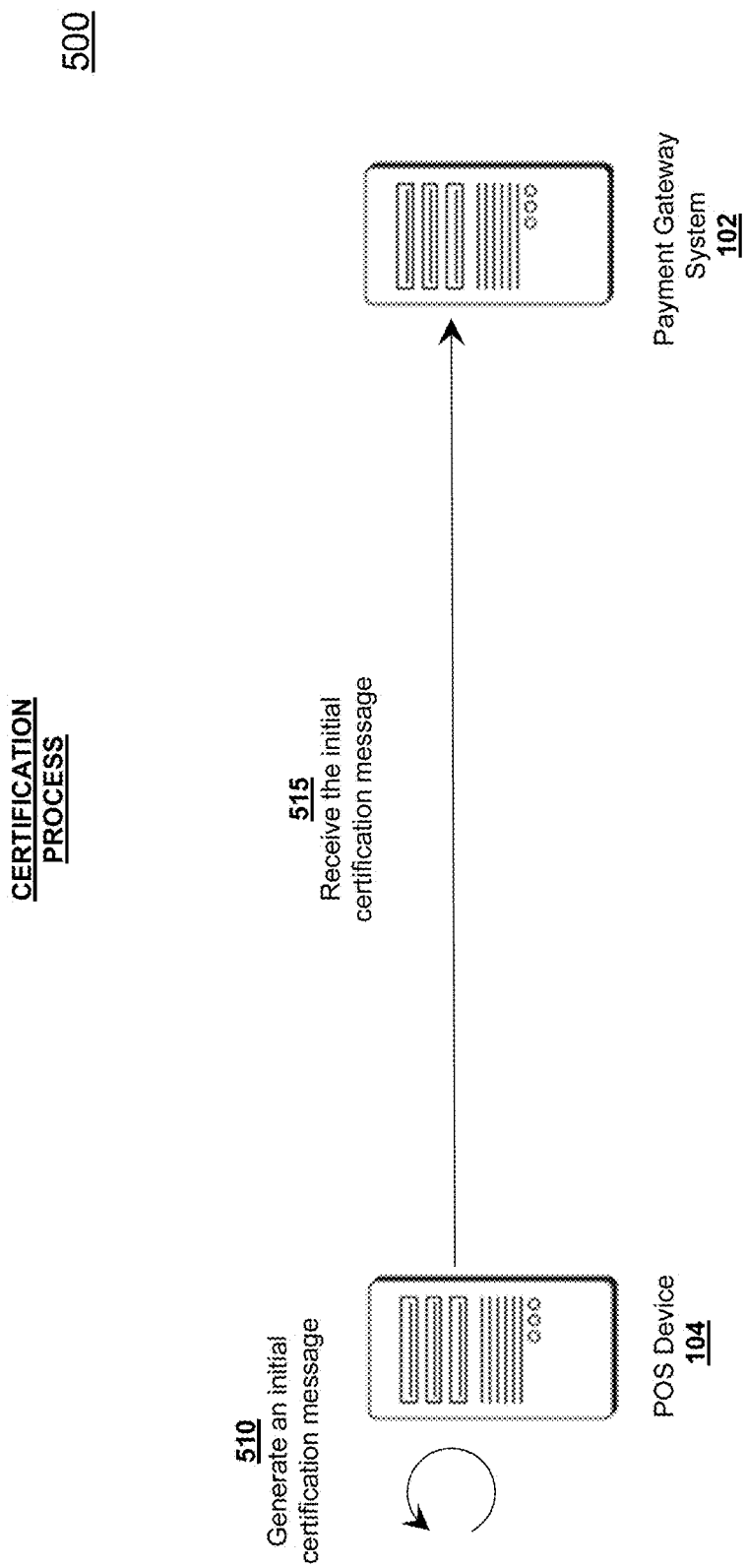

As shown by reference number 510 in FIG. 5A, during a certification process, POS device 104 may generate an initial certification message associated with certifying POS device 104 to process a payment transaction with transaction service provider system 110. POS device 104 may generate the initial certification message that includes a payload associated with a specification of transaction service provider system 110. As further shown by reference number 515 in FIG. 5A, payment gateway system 102 may receive the initial certification message from POS device 104.

As shown by reference number 520 in FIG. 5B, during the certification process, payment gateway system 102 may generate a certification message that includes a payload associated with a specification of transaction service provider system 110. For example, payment gateway system 102 may generate the certification message based on receiving the initial certification message from POS device 104. As further shown by reference number 525 in FIG. 5B, payment gateway system 102 may transmit the certification message to transaction service provider system 110 without transmitting the certification message to acquirer system 112.

As shown by reference number 530 in FIG. 5C, during a production process, POS device 104 may generate an initial transaction authorization request message associated with an electronic funds transfer at POS device 104 during a payment transaction conducted involving POS device 104. As further shown by reference number 535 in FIG. 5C, payment gateway system 102 may receive the initial transaction authorization request message.

Figure 5D:
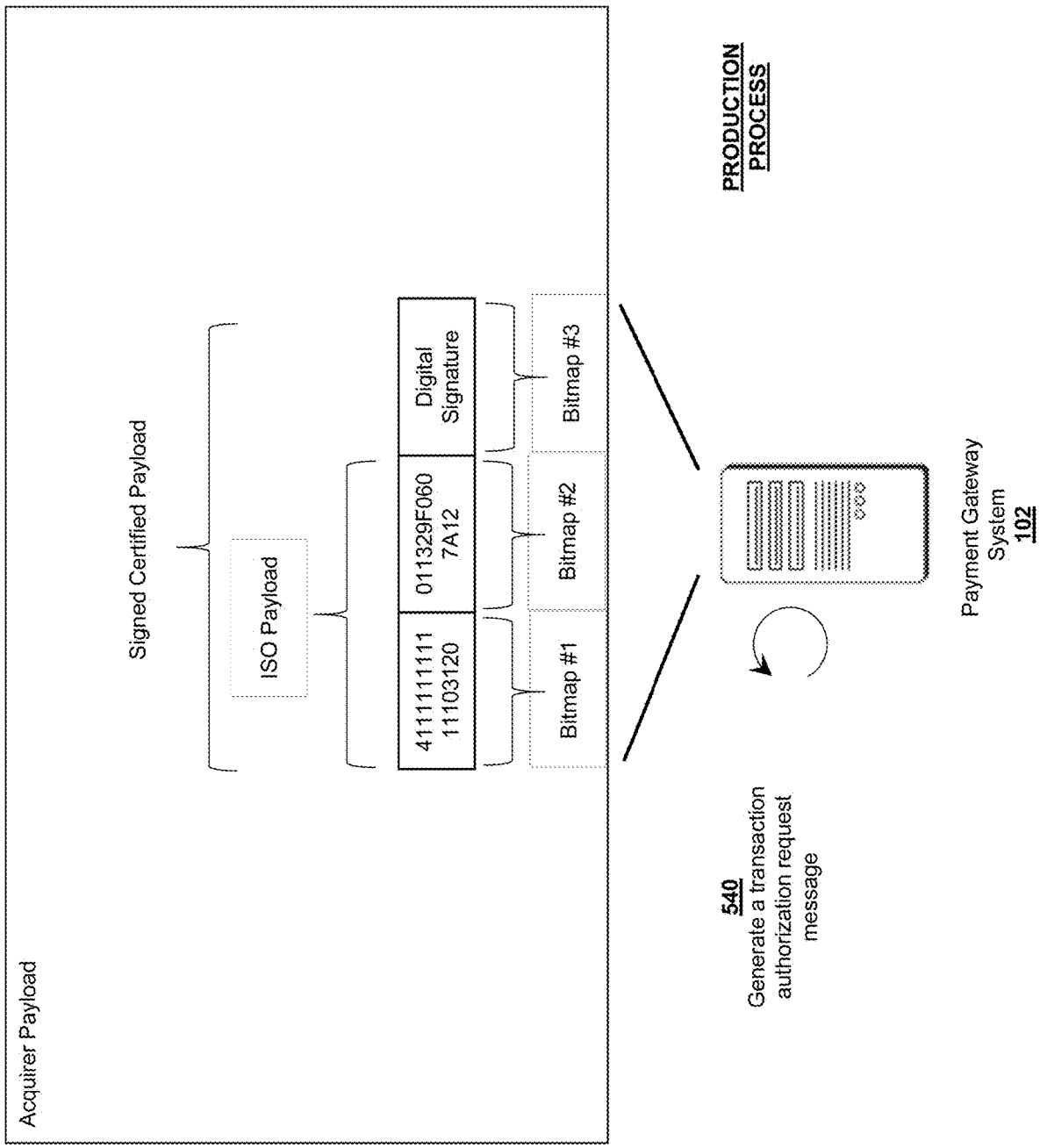

As shown by reference number 540 in FIG. 5D, during the production process, payment gateway system 102 may generate a transaction authorization request message associated with the electronic funds transfer at POS device 104 for the payment transaction. For example, payment gateway system 102 may generate the transaction authorization request message based on receiving the initial transaction authorization request message from POS device 104. In some non-limiting embodiments, payment gateway system 102 may generate a first payload associated with the electronic funds transfer at POS device 104 for the payment transaction based on a specification associated with transaction service provider system 110. As shown in FIG. 5D, the first payload may be an ISO payload (e.g., a payload formatted according to ISO message standard). In some non-limiting embodiments, payment gateway system 102 may generate a second payload associated with acquirer system 112 based on a specification of acquirer system 112. As shown in FIG. 5D, the second payload may be an acquirer payload (e.g., a payload formatted according to a message specification of acquirer system 112, such as a JSON message specification). In some non-limiting embodiments, the transaction authorization request message may include the first payload and the second payload associated with acquirer system 112. In some non-limiting embodiments, payment gateway system 102 may generate a digital signature for the first payload using a private key of payment gateway system 102 and payment gateway system 102 may insert the first payload and the digital signature for the first payload into the second payload. In some non-limiting embodiments, payment gateway system 102 may append the digital signature for the first payload to the first payload to create a signed certified payload. In some non-limiting embodiments, the first payload may encompass the first two bitmaps of an ISO message standard. Additionally or alternatively, the digital signature for the first payload may encompass the third bitmap of the ISO message standard. In this way, payment gateway system 102 may be able to transmit the digital signature using an existing communication infrastructure, which does not require a new messaging standard to be created.

As shown by reference number 545 in FIG. 5E, during the production process, payment gateway system 102 may transmit the transaction authorization request message including the digital signature for the first payload to transaction service provider system 110 via acquirer system 112. For example, payment gateway system 102 may transmit the transaction authorization request message to acquirer system 112 and acquirer system 112 may transmit the transaction authorization request message to transaction service provider system 110. In some non-limiting embodiments, acquirer system 112 may transmit the transaction authorization request message to transaction service provider system 110 without modifying the transaction authorization request message. In some non-limiting embodiments, acquirer system 112 may extract the signed certified payload from the transaction authorization request message and acquirer system 112 may transmit the signed certified payload to transaction service provider system 110.

Figure 5F:
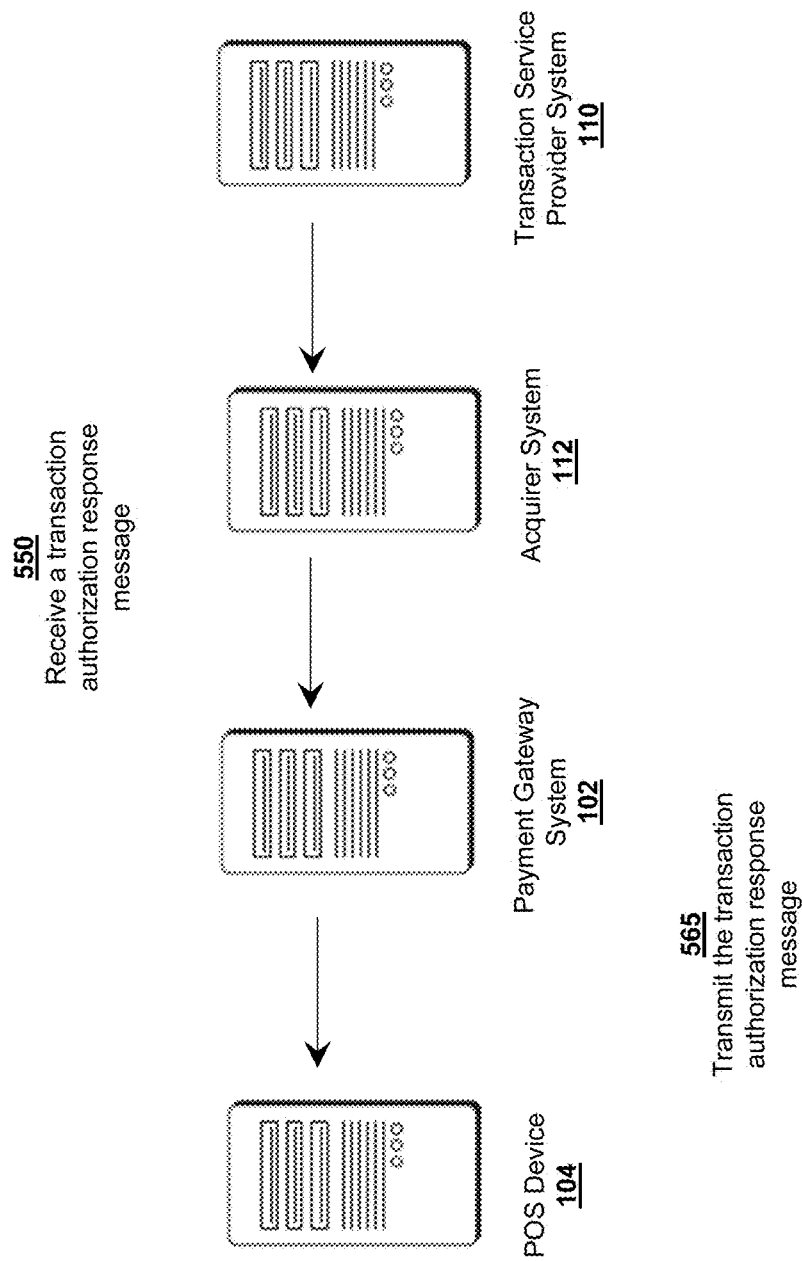

As shown by reference number 550 in FIG. 5F, during the production process, payment gateway system 102 may receive a transaction authorization response message. For example, payment gateway system 102 may receive the transaction authorization response message from transaction service provider system 110 based on the transaction authentication request message. In some non-limiting embodiments, payment gateway system 102 may receive the transaction authorization response message from transaction service provider system 110 via acquirer system 112. For example, transaction service provider system 110 may transmit the transaction authorization response message to acquirer system 112 and acquirer system 112 may transmit the transaction authorization response message to payment gateway system 102 without modifying the transaction authorization response message. As further shown by reference number 565 in FIG. 5F, payment gateway system 102 may transmit the transaction authorization response message to POS device 104. In some non-limiting embodiments, POS device 104 may authorize or decline to authorize the payment transaction based on an indication (e.g., an indication of whether the payment transaction is authorized that is provided by acquirer system 112) included in the transaction authorization response message.

Although the present disclosure has been described in detail for the purpose of illustration based on what is currently considered to be the most practical and preferred embodiments, it is to be understood that such detail is solely for that purpose and that the present disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method for conducting a payment transaction to ensure data integrity of the payment transaction, the method comprising:

transmitting, with at least one processor of a payment gateway system, a public key of a private/public key pair of the payment gateway system to a transaction service provider system;

receiving, with at least one processor of the payment gateway system, data associated with an electronic funds transfer at a point-of-sale (POS) device of a merchant system;

generating, with at least one processor of the payment gateway system, a transaction authorization request message, wherein the transaction authorization request message comprises a first payload associated with the electronic funds transfer at the POS device and a second payload associated with an acquirer system, wherein generating the transaction authorization request message comprises:
generating the first payload associated with the electronic funds transfer at the POS device based on the data associated with the electronic funds transfer at the POS device;
generating the second payload associated with the acquirer system;
generating a digital signature for the first payload using a private key of a payment gateway system; and
inserting the first payload associated with the electronic funds transfer at the POS device and the digital signature for the first payload into the second payload associated with the acquirer system;
transmitting, with at least one processor of the payment gateway system, the transaction authorization request message to the acquirer system, wherein the transaction authorization request message causes the acquirer system to transmit the transaction authorization request message to the transaction service provider system without modifying the transaction authorization request message; and
receiving, with at least one processor of the payment gateway system, a transaction authorization response message from the transaction service provider system;
generating a certification message, wherein the certification message comprises a payload formatted according to a specification of the transaction service provider system; and
transmitting the certification message to the transaction service provider system without transmitting the certification message to an acquirer system.

2. The method of claim 1, further comprising:
verifying an authenticity of the transaction authorization response message using a public key of the transaction service provider system.

3. The method of claim 1, wherein generating the transaction authorization request message comprises:
appending the digital signature for the first payload associated with the electronic funds transfer at the POS device to the first payload associated with the electronic funds transfer at the POS device to create a signed certified payload, and
wherein inserting the first payload associated with the electronic funds transfer at the POS device and the digital signature for the first payload into the second payload associated with the acquirer system comprises:
inserting the signed certified payload into the transaction authorization request message.

4. The method of claim 3, further comprising:
extracting the signed certified payload from the transaction authorization request message; and
transmitting the signed certified payload to the transaction service provider system.

5. A system for conducting a payment transaction to ensure data integrity of the payment transaction, comprising:
at least one processor of a payment gateway system, wherein the at least one processor is programmed or configured to:
transmit a public key of a private/public key pair of the payment gateway system to a transaction service provider system;
receive data associated with an electronic funds transfer at a point-of-sale (POS) device of a merchant system;
generate a transaction authorization request message, wherein the transaction authorization request message comprises a first payload associated with an electronic funds transfer at the POS device and a second payload associated with an acquirer system, wherein, when generating the transaction authorization request message, the at least one processor is programmed or configured to:
generate the first payload associated with the electronic funds transfer at the POS device based on the data associated with the electronic funds transfer at the POS device;
generate the second payload associated with the acquirer system;
generate a digital signature for the first payload using a private key of a payment gateway system; and
insert the first payload associated with the electronic funds transfer at the POS device and the digital signature for the first payload into the second payload associated with the acquirer system;
transmit the transaction authorization request message to the acquirer system, wherein the transaction authorization request message causes the acquirer system to transmit the transaction authorization request message to the transaction service provider system without modifying the transaction authorization request message; and
receive a transaction authorization response messages;
generate a certification message, wherein the certification message comprises a payload formatted according to a specification of the transaction service provider system; and
transmit the certification message to the transaction service provider system without transmitting the certification message to the acquirer system.

6. The system of claim 5, wherein the at least one processor is further programmed or configured to:
verify the authenticity of the transaction authorization response message using a public key of the transaction service provider system.

7. The system of claim 5, wherein, when generating the transaction authorization request message, the at least one processor is programmed or configured to:
append the digital signature for the first payload to the first payload to create a signed certified payload; and
wherein the at least one processor is further programmed or configured to:
extract the signed certified payload from the transaction authorization request message; and
transmit the signed certified payload to a transaction service provider system.

8. A computer program product for conducting a payment transaction to ensure data integrity of the payment transaction, comprising at least one non-transitory computer-readable medium comprising one or more instructions that, when executed by at least one processor of a payment gateway system, cause the at least one processor of the payment gateway system to:
transmit a public key of a private/public key pair of the payment gateway system to a transaction service provider system;
receive data associated with an electronic funds transfer at a point-of-sale (POS) device of a merchant system;
generate a transaction authorization request message, wherein the transaction authorization request message comprises a first payload associated with an electronic funds transfer at the POS device, and a second payload associated with an acquirer system, wherein the one or more instructions that cause the at least one processor to generate the transaction authorization request message, cause the at least one processor to:

generate the first payload associated with the electronic funds transfer at the POS device based on the data associated with the electronic funds transfer at the POS device;

generate a digital signature for the first payload using a private key of a payment gateway system; and insert the first payload associated with the electronic funds transfer at the POS device and the digital signature for the first payload into the second payload associated with the acquirer system;

transmit the transaction authorization request message to the acquirer system, wherein the transaction authorization request message causes the acquirer system to transmit the transaction authorization request message to the transaction service provider system without modifying the transaction authorization request message; and receive a transaction authorization response message from the transaction service provider system;

generate a certification message, wherein the certification message comprises a payload formatted according to a specification of the transaction service provider system; and transmit the certification message to the transaction service provider system without transmitting the certification message to an acquirer system.

9. The computer program product of claim 8, wherein the one or more instructions further cause the at least one processor to verify the authenticity of the transaction authorization response message using a public key of the transaction service provider system.

10. The computer program product of claim 8, wherein, the one or more instructions that cause the at least one processor to generate the transaction authorization request message, cause the at least one processor to:

append the digital signature for the first payload associated with the electronic funds transfer at the POS device to the first payload associated with the electronic funds transfer at the POS device to create a signed certified payload.

* * * * *

UNITED STATES PATENT AND TRADEMARK OFFICE
CERTIFICATE OF CORRECTION

| | | |
|---|---|---|
| PATENT NO. | : 11,379,835 B2 | Page 1 of 1 |
| APPLICATION NO. | : 16/943861 | |
| DATED | : July 5, 2022 | |
| INVENTOR(S) | : Nanduri et al. | |

It is certified that error appears in the above-identified patent and that said Letters Patent is hereby corrected as shown below:

On the Title Page

Column 1, Prior Publication Data, Line 2, Below "Feb. 4, 2021" insert item (30) -- Foreign Application Priority Data Jul. 31, 2019 (IN) 201941030858 --, as a new entry field In the Claims Column 24, Line 28, Claim 5, delete "messages;" and insert -- message; --

Column 26, Line 10, Claim 9, delete "to" and insert -- to: --

Signed and Sealed this
Sixth Day of September, 2022

Katherine Kelly Vidal
*Director of the United States Patent and Trademark Office*